J. A. KOHLRUSS.
HARVESTING MACHINE.
APPLICATION FILED MAY 12, 1920.
1,377,204.
Patented May 10, 1921.
3 SHEETS—SHEET 2.
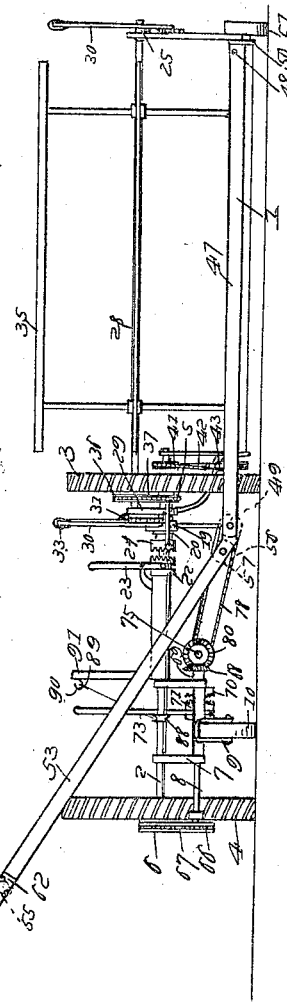
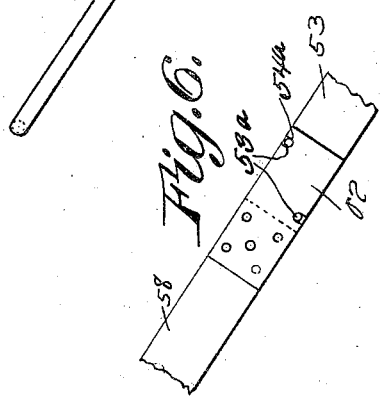
Inventor
Jacob A. Kohlruss,
By Watson E. Coleman
Attorney J. A. KOHLRUSS.
HARVESTING MACHINE.
APPLICATION FILED MAY 12, 1920.
1,377,204.
Patented May 10, 1921.
3 SHEETS—SHEET 3.
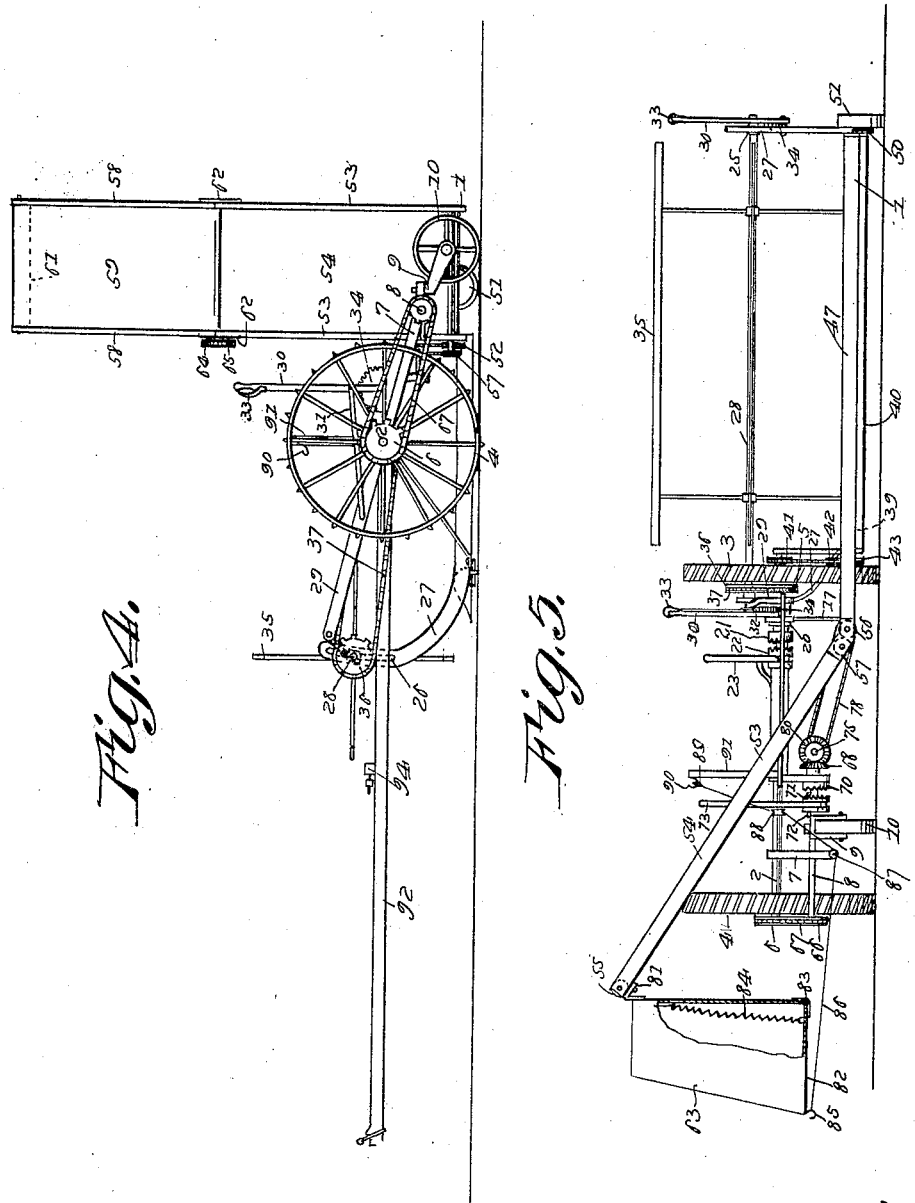
Inventor
Jacob A. Kohlruss,
By Watson E. Coleman
Attorney

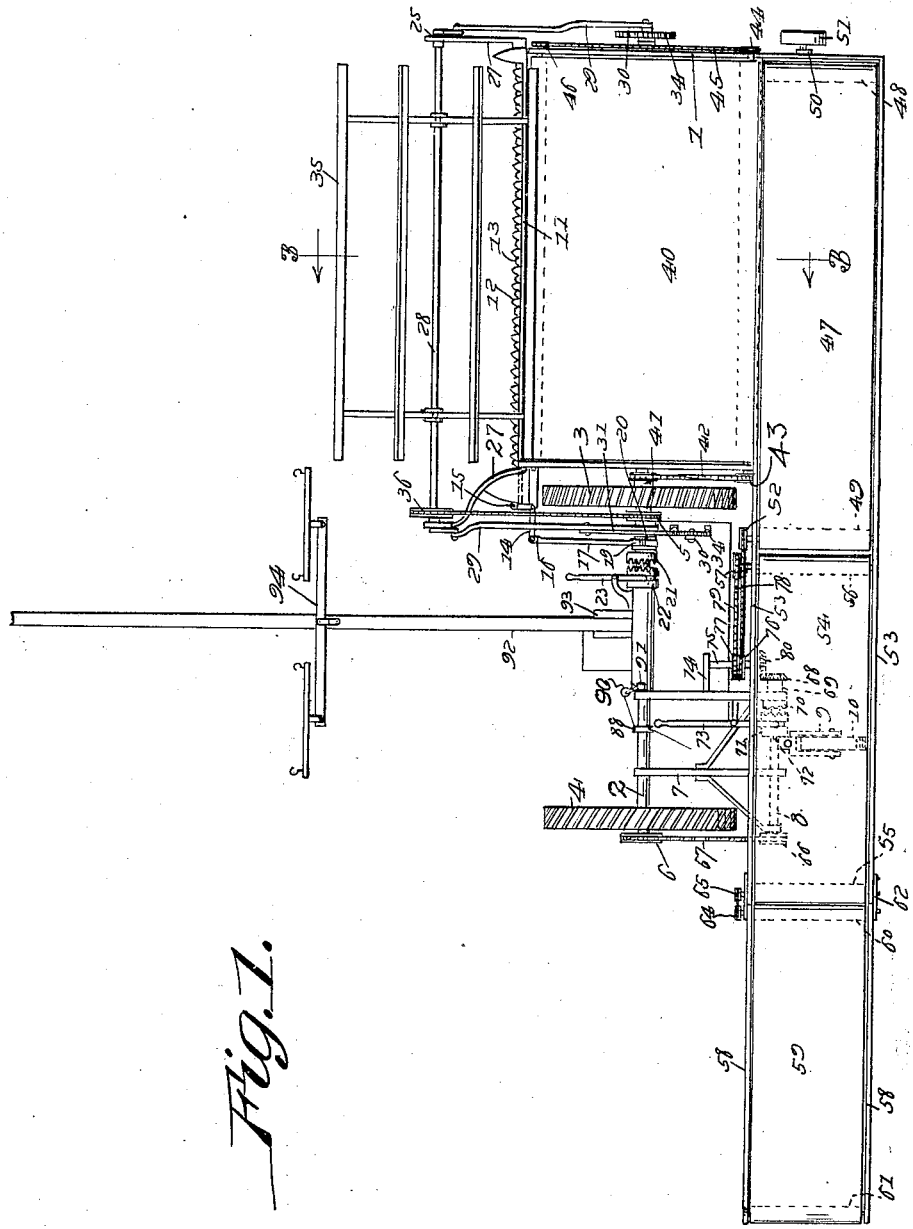

UNITED STATES PATENT OFFICE.

JACOB A. KOHLRUSS, OF GILLETTE, WYOMING, ASSIGNOR OF ONE-HALF TO MRS. M. FRAZER, OF GILLETTE, WYOMING.

HARVESTING-MACHINE.

1,377,204.   Specification of Letters Patent.   Patented May 10, 1921.

Application filed May 12, 1920. Serial No. 380,873.

*To all whom it may concern:*

Be it known that I, JACOB A. KOHLRUSS, a citizen of the United States, residing at Gillette, in the county of Campbell and State of Wyoming, have invented certain new and useful Improvements in Harvesting-Machines, of which the following is a specification, reference being had to the accompanying drawings.

This invention relates to an improved machine or mower for harvesting any small and short grain for cutting or harvesting the crop and loading the crop on wagons at the same time, which saves more crop than dumping the same on the ground.

An object of the invention is to provide a machine which is very simple and which can be made very cheaply and also used in place of a header which saves considerable cost.

Another object resides in a machine which is capable of conveying the crop after it is cut to one side of the machine and dumping it into a wagon or dumping it to one side of the machine, whereas in other machines the grain or crop is conveyed and dumped in the track of the machine in which case the horses or mower or machine will pass over it and tramp the same down.

Still another object is to provide an apparatus of this kind, which may also be used for harvesting hay and corn by removing the loading elevator extension and replacing it with a hopper.

A still further object is to provide a machine wherein improved means is provided for retaining the grain such as corn or hay in the hopper and means which may be manipulated at intervals to permit the discharge of the grain such as corn or hay.

A still further object embodies a machine including means to be actuated for throwing the loading elevators or conveyers in and out of gear with the driving means when the machine is not harvesting and loading the grain.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved machine constructed in accordance with the invention.

Fig. 2 is a rear view of the same showing the loading elevator, and illustrating the means for driving said elevator, and also operating the laterally moving conveyer or elevator.

Fig. 3 is a sectional view on line 3—3 of Fig. 1 showing the position of the reel.

Fig. 4 is a side view of the improved machine, viewing the same from the side toward which the loading elevator extends, thereby showing the driving mechanism between the conveyers and the supporting axle of the machine.

Fig. 5 is a rear view of the machine, showing the extension of the loading elevator as removed and showing the application of the hopper for the grain.

Fig. 6 is a detail view showing the detachable connection between the side pieces 53 of the elevator conveyer 54 and the side pieces 58 of the extension conveyer or elevator 59.

Fig. 7 is an enlarged detail sectional view through the clutch mechanism for the eccentric 20.

Referring more especially to the drawings, 1 designates a suitable frame in bearings of which a supporting axle 2 is mounted. The axle 2 has supporting traction wheels 3 and 4, and also mounted upon the axle or shaft 2 is a sprocket 6. The main frame 1 of the machine includes an auxiliary frame 7 which also has bearings for the shaft 2. This auxiliary frame 7 extends rearwardly as shown, and mounted in bearings thereof is a shaft 8. Also connected to the auxiliary frame 7 is a bracket 9 in the lower ends of the forks of which a supporting caster wheel 10 is journaled, thereby acting to additionally support the frame of the machine.

Mounted on the forward part of the main frame 1 is the usual mowing mechanism 11 which comprises the toothed sickle bar 12, in which a conventional form of cutter bar 13 is mounted and guided. On one corner of the main frame 1 of the machine is a bell crank lever 14, one arm of which has a link connection 15 with one end of the cutter bar, while the other arm has a universal connection 16 with an eccentric rod 17, which is in turn provided with an eccentric strap 19 which operatively engages an eccentric 20, which is mounted upon the drive axle 2. A suitable clutch member 21 is mounted upon the axle 2 and also a clutch member 22 which is keyed to rotate with the axle 2, but at the same time capable of adjustable sliding movements so that by means of a conventional form of lever 23, it may be moved into engagement with a clutch member 21 which is carried by the eccentric 20. Obviously the eccentric can be moved in and out of gear with the axle 2 so as to either operate the cutter bar, or permit the same to remain at rest. In this latter case, the machine will be traversing the field or roadway idly. In the former case, however, the cutter bar will be in motion so as to cut the small or short grain.

Mounted in bearings 25 which are guideable in arcuate slots or guides 26 of upstanding arms 27 of the frame 1, is a reel shaft 28. The upstanding arms are arcuate and are constructed on a radius from the axle 2. Suitable bearings 29 are pivotally mounted upon the axle 2, and are in turn connecting the bearings, in which the reel shaft 28 is mounted. Suitable levers 30 are mounted upon the frame 1 and are in turn provided with link connections 31 with the bars 29 so that by moving the levers 30 in one direction or the other, the bars 29 may be raised and lowered in order to adjust the reel shaft 28. The levers 30 have holding dogs 32 and hand grips 33, the dogs being designed to engage the teeth of the arcuate segment 34 in order to hold the levers 30 in different adjusted positions, in order to hold the reel from displacement after once being adjusted. A reel 35 is mounted to rotate with the shaft 28, and on one end of the shaft a sprocket 36 is fixed. A sprocket chain 37 engages the sprocket 36 and in turn passes about the sprocket 5, which is movable with the eccentric 20 so that when the cutter bar is allowed to remain at rest, by moving the clutch 22 out of gear with the eccentric 20 the reel 35 may be held at rest.

Mounted in bearings of the frame 1 adjacent the forward and rear parts thereof are forward and rear rollers 38 and 39 about which a conveyer 40 travels. The forward roller 38 is smaller in diameter than the rear roller 39 so that the forward end of the conveyer 40 will be tapered or smaller than the rear end. A pulley 41 is mounted upon the axle 2 and is also movable with the sprocket 5 and engaging said pulley is a twisted belt 42, which in turn engages about a pulley 43 of the rear roller 39. By constructing the pulley 41 so as to rotate with the sprocket 5 and also the eccentric 20 it is obvious that when the clutches 21 and 22 are disengaged the pulley 41 will remain at rest, and so will the conveyer or elevator 40. On the other end of the roller 39 is a sprocket 44, which is engaged by a sprocket chain 45 which in turn passes about a sprocket 46 which is carried on one end of the roller 38. By this construction a positive movement of the conveyer 40 is maintained.

As the small or short grain is cut or mowed, the reel strikes the grain and throws it upon the conveyer or elevator 40, thereby carrying it rearwardly, and dumping it upon a transversely moving conveyer or elevator 47. The conveyer or elevator 40 overlies the transversely moving conveyer 47, which conveys the crop laterally of the machine. The conveyer or elevator 47 travels about the rollers 48 and 49, the pintles of which are mounted in bearings of the frame 1. One side of the frame 1 toward the rear carries a bracket 50, the lower end of which suitably supports a caster wheel 51 in order to insure supporting the frame of the machine in order to obviate any vibration that may otherwise occur.

One end of the roller 49 carries a sprocket 52, and connected to one side of the frame 1 are the side pieces 53 of an upwardly and laterally loading conveyer or elevator 54. This upwardly and laterally moving conveyer 54 travels about the upper and lower rollers 55 and 56 and one end of the roller 56 carries a sprocket 57. The sides 53 have extension sides 58, which support an extension conveyer or elevator 59, which passes about the rollers 60 and 61. The extension sides 58 are detachably connected in any suitable manner as at 62 to the sides 53 of the laterally and upwardly moving conveyer 54. The idea of detachably connecting the sides 58 to the sides 53, is to permit the extension conveyer or elevator to be removed for the purpose of attaching a grain receiving hopper 63 shown in Fig. 5. The rollers 55 and 60 are geared together as by means of a sprocket chain and sprockets 64 and 65 so that the two conveyers or elevators will travel in the same direction, whereby the grain may be easily transferred from one to the other when loading a wagon (not shown) but adapted to travel alongside of the harvesting machine, when cutting the grain.

Carried by the shaft 8 which is in bearings of the auxiliary frame 7 is a sprocket 66 provided with a sprocket chain 67, which engages about the sprocket 6 on one end of the shaft 2. On the other end of the shaft 8 a bevel gear 68 is mounted loosely, but which is held against axial movement relatively to the shaft by means of the collar 69.

This bevel gear 68 has a clutch member 70, which is designed to be engaged by a clutch member 71, splined at 72 upon the shaft 8 so as to shift thereon, but rotate therewith. A suitable lever 73 coöperates with the clutch member 71 for moving it into and out of engagement with the clutch member 70 of the bevel gear 68, in order to throw the bevel gear 68 into and out of gear with the shaft 8. Mounted in lateral bearings 74 of the auxiliary frame is a shaft 75 provided with sprockets 76 and 77 about which sprocket chains 78 and 79 engage. These chains in turn pass about the sprockets 52 and 57 so as to transmit power to the conveyers or elevators 47 and 54. The shaft 75 carries a bevel gear 80 which meshes with the bevel gear 68 so that when the gear 68 is in clutch with the shaft 8 power may be transmitted to the shaft 75 and thence to the elevators or conveyers 47 and 54.

When cutting the grain, the machine travels forwardly over the field, and the cutter bar is put into operation by shifting the clutch into engagement with the eccentric 20 in which case the grain is severed, and struck down and allowed to fall upon the conveyer 40, which carries it to the conveyer 47, which in turn transmits it to the conveyer 54 and thence to the extension conveyer 59, which is designed to deliver it into a wagon (not shown) and which is adapted to be driven along side of the apparatus in its travel over the field.

However, in harvesting corn or hay, the extension elevator or conveyer 59 may be detached, and in its stead a hopper may be substituted. This hopper 63 is connected to the sides of the elevator 54 as at 81 in any suitable manner. In this case as the corn or hay is harvested and then conveyed to the elevator 47 and thence to the elevator 54, it is allowed to deposit into the hopper. At intervals along the field as the apparatus traverses the same, the hopper may be dumped. A closure 82 is hingedly mounted on the hopper 63 as at 83, and is held in closed position by means of a relatively strong tension spring 84, which acts to close the closure, after the contents of the hopper have been dumped. A hook 85 is carried by the closure and connected to the same is a cable or chain 86, which in turn passes over pulleys 87 and 88, and has its end provided with a hook or eye 89. This hook or eye 89 is designed to engage a hook 90 which is carried by an upright or brace 91, in order to hold the chain or cable, while the closure is in a closed position.

When it is desired to permit the discharge of the corn or hay in the hopper the eye 89 may be detached from the hook 90, and then a pulling action may be imparted to the chain, thereby moving the closure pivotally to its open position, allowing the corn or hay to automatically discharge. As before stated, the corn or hay is allowed to discharge at intervals along the field, and may be arranged in piles or dumped into a wagon body or other suitable receptacle. The frame of the machine has the usual draft tongue 92, connected thereto at 93 and is provided with a conventional form of draft equalizer 94 whereby the apparatus may be drawn over the field.

The detachable connection between the sides 53 and 58 of the conveyers 54 and 59 comprise the notch and pin connections 53ª and 54ª so that the extension elevator conveyer 59 can be easily detached. The sides 58 of the extension conveyer 59 can be passed between the pins 53ª so that the notches will engage the pins and support the extension conveyer as shown in Fig. 2.

The harvesting machine herein disclosed and illustrated may be used in connection with any type of mower or any other machine adapted for cutting grain and the like.

The invention having been set forth, what is claimed as new and useful is:—

1. In a machine as set forth, a wheel supported frame having arcuate guides and a mowing mechanism, a driving element mounted on the frame, members pivotally mounted upon the driving element, a reel mounted in the arcuate guides whose radii extend from the driving element, said reel operatively connecting with said pivoted members, whereby the reel is capable of movement in a vertical plane toward and from the mowing mechanism.

2. In a machine as set forth, a wheel supported frame having arcuate guides and a mowing mechanism, a driving element mounted on the frame, members pivotally mounted upon the driving element, bearings operatively connecting with said members, a reel operatively mounted in said bearings and having means engaging the arcuate-guides whose radii extend from the driving element, whereby the reel is capable of movement in a vertical plane toward and from the mowing mechanism, and means operatively connecting with the members for holding them in different positions for positioning the reel relatively to the mowing mechanism.

3. In a machine as set forth, a wheel supported frame including a driving element and provided with a mowing mechanism, a rearwardly moving conveyer operatively connected with the driving element, a transversely movable conveyer at the rear of the first conveyer, an elevator extending laterally and upwardly from one end of the transverse conveyer, means operatively connecting the transverse conveyer and the elevator with the driving element, a container adapted to receive the grain from the upper end of the elevator, said container having a hingedly mounted closure, and means to be manually manipulated and operatively connected to the closure whereby the grain may be allowed to dump from the container.

4. In a machine as set forth, a wheel supported frame including a driving element and provided with a mowing mechanism, a rearwardly moving conveyer on said frame operatively connected with the driving element, a transversely moving conveyer at the rear of the first conveyer, an upwardly and laterally moving elevator extending from one end of the transverse conveyer, means operatively connecting the driving element and the transverse conveyer and the elevator for imparting movement thereto simultaneously, a hopper at the upper end of the elevator, a tensioned closure therefor movable to permit the discharge of the grain therefrom, and manually operated means connected to the closure for opening the same against the action of its tensioning means.

5. In a machine as set forth, a wheel supported frame including a driving element, arcuate guides on said frame and whose radii extend from the element, a reel mounted in said guides for movement in a vertical plane, members pivotally mounted on the driving element and being connected to the shaft of the reel, and a device operatively connected with each of said members for adjusting the same, for disposing the reel in different positions and holding the same.

6. In a machine as set forth, a wheel supported frame, a cutting mechanism including a cutting member, a drive axle on which the supporting wheels of the frame are mounted, means operatively connecting the cutting member and the axle for imparting reciprocating motion to the member, arms carried by the frame of the cutting mechanism and having arcuate slots whose radii are concentric with the axle of the supporting wheels, a reel mounted in the arcuate slots for movement in a vertical plane and adapted to knock the grain upon a conveyer carried by the machine, means operatively connecting the reel and the axle for rotating the former, means pivotally carried by the axle and connected to the reel, so that both ends of the reel may be moved substantially uniformly, and means for adjusting the reel in said arcuate slots to positions relatively to the cutting mechanism.

7. In a machine as set forth, a frame, supporting wheels therefor, a grain cutting mechanism including a cutting member, arcuate guides rising upwardly from the frame and whose radii are concentric with the axle of the supporting wheels, a reel movable in said guides for adjustment toward and from the cutting member of the cutting mechanism, bars pivotally mounted upon the axle of the supporting wheels and connected to the reel for moving both ends of the reel uniformly, and means having link connection with the bars for adjusting the reel.

8. In a machine as set forth, a frame, supporting wheels therefor, a cutting mechanism including a cutting member, a conveyer extending rearwardly from the cutting mechanism including forward and rear rollers, an axle on which the supporting wheels are mounted, gear connections between the axle and the rear roller, gear connections between the forward and rear rollers at the end of the conveyer opposite the first gear connections, to insure uniformity of movement of the conveyer, a conveyer at the rear of the first conveyer, an upwardly and laterally extending conveyer extending from the rear conveyer, gear connections between the last two conveyers and the axle, a reel mounted on the frame adjustable in a vertical plane toward and from the cutting mechanism, gear connections between the reel and the axle, and means on the axle for controlling the driving of the several conveyers, the cutting member and the reel.

In testimony whereof I hereunto affix my signature.

JACOB A. KOHLRUSS.